(12) United States Patent
Moore

(10) Patent No.: US 7,228,636 B1
(45) Date of Patent: Jun. 12, 2007

(54) PIVOTING RAFTER SQUARE WITH MULTIPLE INSIGNIA

(76) Inventor: Darren S Moore, 109 Ocean Ave., Center Moriches, NY (US) 11934

( * ) Notice: Subject to any disclaimer, the term of this patent is extended or adjusted under 35 U.S.C. 154(b) by 0 days.

(21) Appl. No.: 11/273,490

(22) Filed: Nov. 14, 2005

(51) Int. Cl.
*B43L 7/12* (2006.01)
(52) U.S. Cl. .............................. 33/417; 33/423; 33/465
(58) Field of Classification Search .................. 33/407, 33/471, 417–418, 421–426, 465, 1 N
See application file for complete search history.

(56) References Cited

U.S. PATENT DOCUMENTS

| 42,230 | A | | 4/1864 | Shelley |
|---|---|---|---|---|
| 330,799 | A | | 11/1885 | Orendorff |
| 359,372 | A | | 3/1887 | Warnock |
| 485,456 | A | | 11/1892 | Cook |
| 518,103 | A | | 4/1894 | Hodge |
| 743,900 | A | | 11/1903 | Mahan |
| 928,569 | A | | 3/1909 | Williams |
| 1,159,483 | A | | 11/1915 | Ernest |
| 1,191,008 | A | | 7/1916 | Laakkonen |
| 1,394,298 | A | * | 10/1921 | Foore ........................... 33/417 |
| 1,453,625 | A | | 5/1923 | Johnson |
| 1,483,761 | A | | 2/1924 | Youngblood |
| 1,521,980 | A | | 1/1925 | Zook |
| 1,834,389 | A | | 12/1931 | Drescher |
| 1,913,919 | A | | 6/1933 | Dion |
| 2,251,208 | A | | 3/1941 | Sigmon |
| 2,504,244 | A | | 4/1950 | Barclay |
| 2,726,452 | A | | 12/1955 | Maupin |
| 4,208,804 | A | | 6/1980 | Lundin |
| 4,712,307 | A | | 12/1987 | Kish |
| 5,419,053 | A | * | 5/1995 | Kathan ........................ 33/417 |
| 5,446,969 | A | | 9/1995 | Terenzoni |
| 5,452,522 | A | | 9/1995 | Kook et al. |
| 5,539,991 | A | | 7/1996 | Harrison |
| 6,122,834 | A | | 9/2000 | Rester |
| 6,330,752 | B1 | | 12/2001 | Ellam |
| 6,725,555 | B1 | | 4/2004 | Moore |
| 6,792,687 | B2 | * | 9/2004 | Arent et al. .................. 33/471 |
| 2006/0156558 | A1 | * | 7/2006 | Owens .......................... 33/42 |

* cited by examiner

*Primary Examiner*—Yaritza Guadalupe-McCall
(74) *Attorney, Agent, or Firm*—Michael I Kroll

(57) ABSTRACT

A framing square includes a right-angle square formed from a first member and a second member connected to each other at a respective distal end of each thereof and forming a right-angle connection therebetween. An angular measuring member is positioned at the right-angle connection. An indicator guide is positioned on a first side of the right-angle square and pivotally connected at a pivot point positioned at the right angle connection and moveable about a first side of the angular measuring member. An indicator arm is connected to the indicator guide and further includes a means for securing the indicator guide at a predetermined angle along said angular measuring member. The pivotal indicator arm and the pivotal indicator guide can be secured to the right-angle square resulting in a user able to consistently measure a same angle.

4 Claims, 9 Drawing Sheets

PIVOTING RAFTER SQUARE WITH MULTIPLE INSIGNIA

BACKGROUND OF THE INVENTION

1. Field of the Invention

The present invention relates generally to squaring tools, and more specifically, to a rafter square having a pivoting guide member and related locking means that will allow the user to selectively position the square at a specified angle as determined by indicia thereon. The pivoting guide member, related locking means, and indicia are used to form a desired angle to aid carpenters in laying out angle guts in rafters. Furthermore, the indicia inscribed on the rafter square include a chart of points comprised of arithmetical guide markings for various roofing styles.

2. Description of the Prior Art

There are other squaring tools described in the prior art. Typical of these are U.S. Pat. Nos. 42,230; 330,799; 359,372; 485,456; 518,103; 743,900; 928,569; 1,191,008; 1,159,483; 1,453,625; 1,453,625; 1,834,389; 1,913,919; 2,251,208; 2,504,244; 2,726,452; 4,208,804; 4,712,307; 5,446,969; and 5,452,522.

U.S. Pat. No. 42,230

Inventor: G. A. Shelly

Issued: Apr. 5, 1864

Similar letters of reference in the three views indicate corresponding parts. This invention includes a square attached to an ordinary slotted stock, by means of a screw-pivot, in such a manner that said square can be turned on the pivot and set in any desired position in relation to the stock, and either arm of the square can be used to draw lines in an oblique direction to the edges of the stock, or, if desired, the square can be converted into and used as a T-square.

U.S. Pat. No. 330,799

Inventor: George B. Orendorff

Issued: Nov. 17, 1885

A protractor, A, having an arm, B, and center, C, combined with a movable arm, D, at right-angle and provided with the curved indicator-arm d, substantially as shown, for the purpose specified.

U.S. Pat. No. 359,372

Inventor: David Wesley Warnock

Issued: Mar. 15, 1887

The combination of the body A, having slots a, c, the blade B, provided with the beveled shoulder a, the slotted bar C, provided with the pivot b, substantially as herein shown and described.

U.S. Pat. No. 485,456

Inventor: Thomas R. Cook

Issued: Nov. 1, 1892

The object of my said invention is to produce a tool which will embody the ordinary try-square and bevel, and also a rafter-gage and scale, by which the ends of rafters for any desired pitch of roof may be accurately and conveniently marked for cutting and their length determined, all as will be hereinafter more particularly described and claimed.

U.S. Pat. No. 518,103

Inventor: Leonard M. Hodge

Issued: Apr. 10, 1894

In an instrument of the class described, a scale-plate having an integral plumb-cut member, and a bottom-cut member, and having on one side graduations showing the relative dimensions of parts for common rafters of different rises and runs, and having on the other side, graduations showing the relative dimensions of octagon rafters for different rises and runs, in combination with a main frame, a blade slidable on said main frame and having a changeable connection with said scale plate, as set forth.

U.S. Pat. No. 743,900

Inventor: William B. Mahan

Issued: Nov. 10, 1903

In an instrument of the class described, a scale plate having an integral plumb end member, and a bottom cut member, and having an integral bottom cut member, and having on one side graduations showing the relative dimensions of parts for common rafters of different rises and runs, and having on the other side, graduations showing the relative dimensions of octagon rafters for different rises and runs, in combination with a main frame, a blade slidable on said main frame and having changeable connection with said scale plate.

U.S. Pat. No. 928,569

Inventor: Edmund A. Williams

Issued: Jul. 20, 1909

A device of the character described, comprising a longitudinally slotted handle, a square pivotally attached at its outer corner to one corner of said handle, one blade of said square having diagonal lines adjacent its inner edge and adapted to lie in said slot, and means to secure said handle and square in adjusted position.

U.S. Pat. No. 1,159,483

Inventor: A. C. Ernest

Issued: Nov. 9, 1915

This invention relates to protractors and more particularly to a protractor or gage for use by carpenters in cutting the rafters for a building roof, the aim of the invention being to provide an instrument of this class which will obviate the use of the ordinary carpenter's square in obtaining the desired measurements and in determining the angles at which the ends of the rafters are to be cut, and which will further obviate the necessity of a carpenter making calculations which are necessary if the ordinary square is to be employed.

U.S. Pat. No. 1,191,008

Inventor: Ephraim Laakkonen

Issued: Jul. 11, 1916

A carpenter's square comprising a blade and a tongue on the inner edge thereof, a notched plate mounted in the curved edge of the quadrant, a forked setting arm pivoted to the square and embracing the quadrant, and a pivot latch mounted on the setting arm and selectively engageable in the notches of the plate to secure the setting arm in a desired adjustment.

U.S. Pat. No. 1,453,625

Inventor: Robert H. Johnson

Issued: May 1, 1923

A tool comprising a butt, a blade pivoted to the butt, said butt having a notch in one edge thereof, curved parts at each end of the notch arranged to lie at opposite sides of one edge of the blade, when said blade is disposed at right-angles to the butt.

U.S. Pat. No. 1,834,389

Inventor: W. H. Drescher

Issued: Dec. 1, 1931

The present invention relates to stair protractors and embodies an improved form of protractor for laying out stairs of any desired pitch, as well as providing; a means for laying off the banisters without readjustment of the protractor. It is contemplated that the protractor maybe used to lay off stairs upon stringers of considerable width and provision is made to accommodate conditions' of this character as well as to permit the step and risen marking to be made at any-point in the depth of the stringer. After an initial setting of the instrument, there is no need for further adjustment as long as the step and riser relationship of a stairway remains constant. By the construction provided herein, the protractor is easily and securely adjusted, no particular shill being required to effect the adjustment.

U.S. Pat. No. 1,913,919

Inventor: Isaie Dion

Issued: Jun. 13, 1933

A square comprising blade and tongue members pivoted to each other at their meeting ends, said blade member being formed with a recess into which the tongue member may be received as a whole when it is swung into a folded position, a screw carried by the blade member adapted to engage the end of the tongue remote from the pivot when the members are closed upon each other for securing them together, one of the members having an arcuate slot concentric with the pivot, a screw passing through said slot and engaging the other member of the square so as to fasten the members in any desired angular relationship with respect to each other, and said member with the arcuate slot being countersunk at one end of said slot to afford a deeper seat for engagement with the head of said screw so that the members may be positively locked when they are swung to right-angles with respect to each other.

U.S. Pat. No. 2,251,208

Inventor: Dallas L. Sigmon

Issued: Jul. 29, 1941

The combination with a square having body and tongue members, of a radial arm having scale markings thereon substantially as shown and described, a quadrant shaped arm pivotally attached to the tongue member aforesaid, and the said quadrant shaped arm having provided a straight outer edge adapted to form with the radial arm the angle of the side cut for hip, valley and jack rafters of a gable roof when the body member and radial arm aforementioned are adjusted to the angle of inclination of the said rafters, and means provided on said quadrant shaped arm for registering on the scale markings provided on the radial arm aforesaid.

U.S. Pat. No. 2,504,244

Inventor: C. E. Barclay

Issued: Apr. 18, 1950

This invention relates to a measuring instrument especially adapted for use by carpenters in layout work and which can be accurately employed for measuring the hypotenuse of a right-angle triangle both as to degree and length. More particularly, it is an aim of the invention to provide a measuring instrument which is especially useful in laying out length and miter cuts for complicated roofs, rafters, braces and stair runs and which will save considerable time in layout work and eliminates the necessity of making scale drawings to ascertain degree and linear measurements.

U.S. Pat. No. 2,726,452

Inventor: Leslie E. Maupin

Issued: Dec. 13, 1995

A device of the class described, a quadrant plate having a level ruling edge, a plumb ruling edge and an arcuate edge, a pivot pin on said plate with the axis thereof in alignment with said level ruling edge and at the geometric center of said arcuate edge, a pivot pin on said plate with the axis thereof in alignment with said axis of the pivot pin, arcuate scales and indicia on said plate with said axis of said pivot pin as the geometric center thereof, cooperating indicia on said bar, said bar including a pair of similar strips spanning and adapted to traverse the opposite sides of the quadrant plate, both ends of each of said strips projecting beyond the peripheral edge of said plate, spacing elements fixed between the adjacent projecting ends, a scale arm pivotally mounted on said quadrant plate between said pivot pin for aid bar and the plumb edge of said plate and adapted to be extended outwardly at right-angles to said plumb edge.

U.S. Pat. No. 4,208,804

Inventor: Birgitta M. Lundin

Issued: Jun. 24, 1980

A ruler means for dividing a distance into an optional number of parts, e.g., into equal parts. The ruler means comprises a ruler with a number of numbered scales with a zero point. Said ruler is, along said scales, provided with holes for plotting an optional division of an auxiliary distance such the projection thereof comprises the actual distance to be divided. The holes are equidistantly spaced and tapered toward the rear face of said ruler.

U.S. Pat. No. 4,712,307

Inventor: Karl. E. Kish

Issued: Dec. 15, 1987

The rafter angle device includes a body in the form of a generally U-shaped plate of metal or the like having a horizontal base and spaced first and second vertical arms at opposite ends thereof. A third arm is pivotally connected to the plate at about the end of the base bearing the first arm and extends beyond the second arm. The third arm may releasably receive and is releasably securable to at least one of the first and second arms in any position between about horizontal and vertical, as by a locking nut. The first arm has a generally triangular support portion secured to the base about halfway along the length thereof and defining a spaced pair of curved slots, with angle, hip rafter valve and common jack plumb cut indicia disposed along the perimeter of the slots thereof. The support portion may also bear door sill and window sill indicia, while at least one margin of each of the three arms and base bear linear indicia in fractions of an inch. The third arm has a bubble level in a cage so as to be releasable from all major angles. The base is adapted to measure roof rafter angles and also serves as a U-square.

U.S. Pat. No. 5,446,969

Inventor: Robert Terenzoni

Issued: Sep. 5, 1995

A combination square and multi-purpose hand tool can be utilized as a large number of hand tools including a square, bevel square, stud and ceiling strapping spacer, clamp, caliper, string tender, and scribe. A first L shaped member includes a blade portion and a handle portion. A second member is pivotably and slidably coupled to the blade portion of the first member. Individual member dimensions such as the overall length of the first member, the maximum extended length of the second member along the first member, and the width of the blade portion of the first member are pre-established at selected lengths and widths, to provide predetermined functions for the present multi-purpose hand tool such as a stud spacer, ceiling strapping spacer and string tender.

U.S. Pat. No. 5,452,522

Inventor: Donald D. Kook, et al.

Issued: Sep. 26, 1995

A framing layout tool includes two squares each with two legs or blades 90 degrees apart. The squares are pivotally attached at their vertices by a pivot pin including a knurled locking nut. One of the squares includes a longitudinally aligned electronic plumb and level indicator on one of the legs. The other leg of that square includes indicia on a leg reference edge for indicating rise-over-run integers representative of the angular separation of that other leg and a leg of the other square. Indicia indicating the actual angle between such legs is also contained on an opposite reference edge of that other leg. The layout tool has particular utility for accurately marking the location of a plumb cut, seat cuts and a ridge cut in roof rafters where the blade of the second square is placed on an inclined rafter and oriented with the electronic level in a vertical plumb position. When a visual and auditory indication of exact plumb is obtained the clamping nut is locked. Using the locked device, the angle of inclination can be read and locked unit used to scribe cutting lines on a rafter to have the same inclination as the first measured rafter.

U.S. Pat. No. 5,539,991

Inventor: Michael W. Harrison

Issued: Jul. 30, 1996

An adjustable square device for scribing cut lines on large flat panels. The device has as a base member a straight, flat, rectangular bar. Pivotally connected at one end to the base member is an angularly adjustable pivot arm, also comprising a straight, flat, rectangular bar having an arcuate extension on one where such pivot arm is connected to the base member. The arcuate extension extends through a slot in the base member and is marked in degrees to form a quarter circle protractor integral with the pivot arm. Such protractor contains therein an arcuate groove, parallel with the outer edge of such arcuate extension and spaced inwardly therefrom. An adjustable stop extends through said groove and through the base member. The arcuate extension is pivoted on a pin affixed at the end thereof to the base member. Releasing the adjustable stop permits the pivot arm to be angled relative to the base member to the desired degree as indicated on the protractor. A short bar member is affixed to the base of the pivot arm to stop the swing thereof at a right-angle to the base member. A further support bar extends medially from the base member at the end thereof remote from the pivot arm to permit the square device to be used either side up.

U.S. Pat. No. 6,122,834

Inventor: Glenn Steven Rester

Issued: Sep. 26, 2000

A combination speed and framing square includes first and second legs joined to form a right-angle. The first and second legs are substantially longer than those found on a typical framing square allowing higher pitch roof rafters to be sequentially marked in increments of two feet. A third leg is attached to the first and second legs forming the hypotenuse of a right triangle with the first and second legs. The third leg has an elongated marking aperture with hip and valley and common rafter marking indicia on opposing sides thereof as well as incremental angular indicia adjacent its outer edge as with a typical speed square. Level indicators such as bubble levels are disposed on the first and second legs. At each end of the first leg and at a distal end of the second leg is an integral elongated slot each dimensioned to removably receive a rolling measuring device with a digital distance indication means on the exterior thereof. Accordingly, a distance may be quickly and easily measured by rolling the device along a surface and visually reading the display device.

U.S. Pat. No. 6,330,752

Inventor: Albert F. Ellam

Issued: Dec. 18, 2001

An adjustable squaring tool for measuring and marking angles includes a pivot arm pivotally coupled between first and second sections of a main member. The pivot arm having a graduated arcuate measurement arm extending from the pivot arm through a channel in the main member. The pivot arm having a cylinder coupled to an end of the pivot arm. The main member includes a drum passing through the cylinder. The cylinder has a plurality of radially spaced apertures corresponding to the gradations of the measurement arm. The drum includes at least one spring biased bearing positioned for engaging apertures in the cylinder as the cylinder rotates about a drum. A locking assembly is provided for clamping the pivot arm between the first and second sections of the main member to lock the pivot arm relative to the main member. In an embodiment the apertures are spaced for adjusting the tool in one degree increments between 10 degrees and 90 degrees.

While these squaring devices may be suitable for the purposes for which they were designed, they would not be as suitable for the purposes of the present invention, as hereinafter described.

SUMMARY OF THE PRESENT INVENTION

The present invention relates generally to squaring tools, and more specifically, to a rafter square having a pivoting guide member and related locking means that will allow the user to selectively position the square at a specified angle as determined by indicia thereon. The pivoting guide member, related locking means, and indicia are used to form a desired angle to aid carpenters in laying out angle guts in rafters. Furthermore, the indicia inscribed on the rafter square include a chart of points comprised of arithmetical guide markings for various roofing styles.

A primary object of the present invention is to over come the shortcomings of the prior art.

Another object of the present invention is to provide a pivoting rafter square for laying out rafters and calculating the length and angles of the required cuts.

Another object of the present invention is to provide a pivoting rafter square that can be used separately as a tee square or rafter square with the guide detached.

Still yet another object of the present invention is to provide a pivoting rafter square that can be used as a protractor.

Yet another object of the present invention is to provide a pivoting rafter square that can be used as right-angle ruler.

Still another object of the present invention is to provide a pivoting rafter square where the indicia can be used as a conversion table chart.

Another object of the present invention is to provide a pivoting rafter square that can be used as a bevel square for repetitive marking.

Yet another object of the present invention is to provide a pivoting rafter square having a detachable guide similar to a tee-square that is pivotally connected to the heel portion of the right-angle square.

Another object of the present invention is to provide a pivoting rafter square where the guide is used to measure an angle against the right-angle square.

Still another object of the present invention is to provide a pivoting rafter square wherein the pivotally connected guide and right-angle square can be locked into the desired position by the user by means of a locking mechanism such as a thumbscrew.

Still another object of the present invention is to provide a pivoting rafter square having a slide pin that allows the pivotal indicator arm to slide along a path thereby providing stability and increased accuracy.

Yet another object of the present invention is to provide a pivoting rafter square having a right-angle square with indicia located thereon denoting the angles and degrees for quickly and accurately determining the angle of each situational cut for common angles, common rafter, hip valleys, irregular hip valleys and octagonal construction.

Another object of the present invention is to provide a pivoting rafter square having indicia for use in roofing construction types including but not limited to gable, cross gabled, simple hip, pyramid hip, cross hipped, mansard, saltbox, gambrel and simple flat roof.

Still another object of the present invention is to provide a pivoting rafter square that eliminates the need to repeatedly align increments on each side of the square for one work-piece for plumb cuts, seat cuts and overhangs.

Another object of the present invention is to provide a pivoting rafter square that includes a pivotal indicator guide that is slightly bowed away from the base square at both distal, providing improved means for positioning and handling.

Another object of the present invention is to provide a pivoting rafter square having a guide member that can be pressed against the work-piece, including that with rough edges, knots and other irregularities in the plane of the work-piece, providing more accuracy over conventional squares.

Still yet another object of the present invention is to provide a pivoting rafter square that is inexpensive to manufacture and operate.

A further object of the present invention is to provide a pivoting rafter square that is simple and easy to use.

Additional objects of the present invention will appear as the description proceeds.

The foregoing and other objects and advantages will appear from the description to follow. In the description reference is made to the accompanying drawing, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawing, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Figure 1:
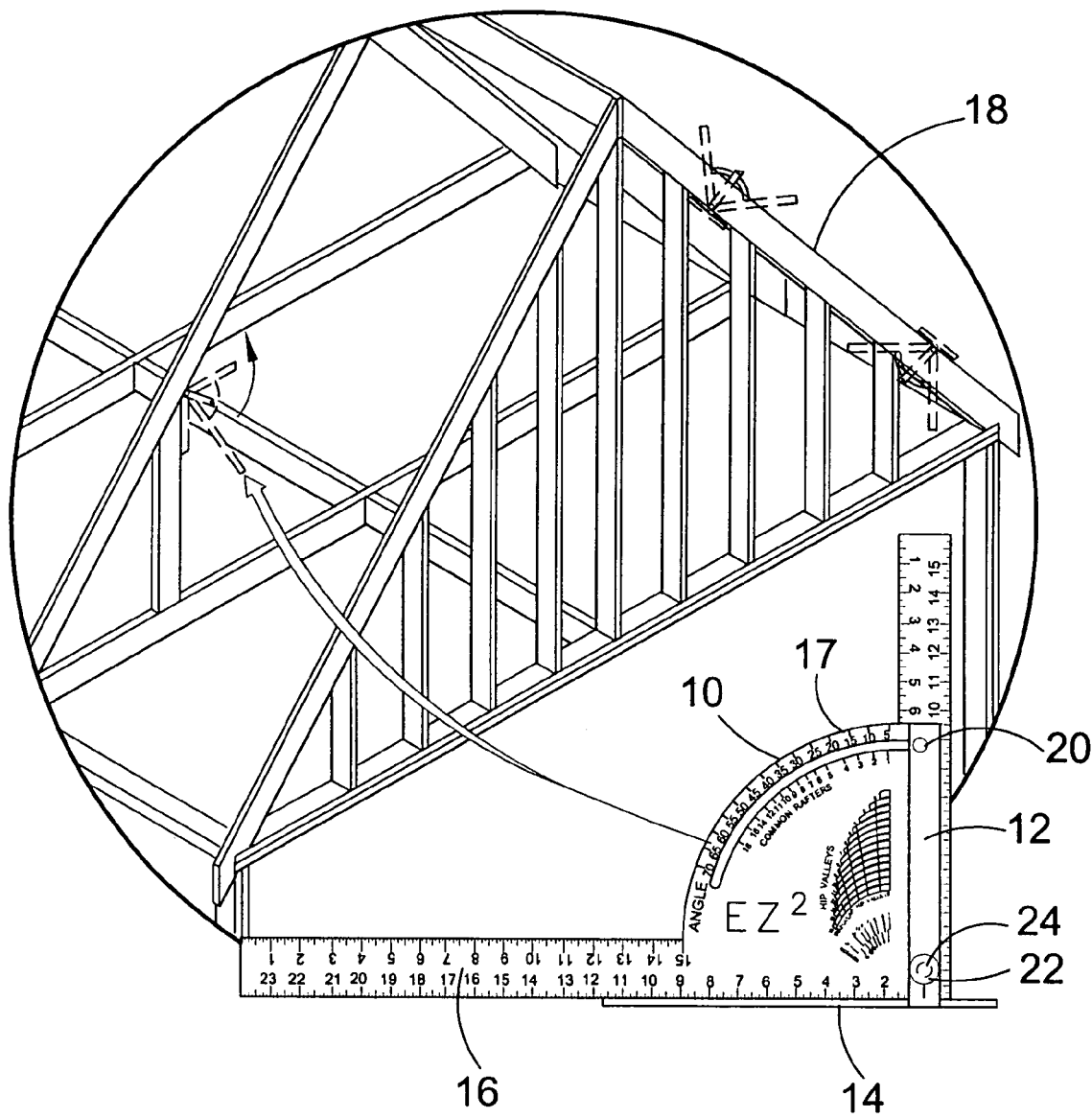
FIG. 1 is an illustrative view of the rafter square of the present invention in use.

Turning now descriptively to the drawings, in which similar reference characters denote similar elements throughout the several views, the Figures illustrate the squaring tool of the present invention of the present invention. With regard to the reference numerals used, the following numbering is used throughout the various drawing figures.

10 rafter square of the present invention
12 pivotal indicator guide
14 pivotal indicator arm
15 pivotal indicator arm surface
16 right-angle square
17 protractor-like curved edge
18 rafter
20 slide pin knob
22 pivot point knob
24 pivot point
26 angle indicia
28 slide pin track
30 conversion table
32 slide pin
34 pivot point pin
36 seat cut indicia
38 plumb cut indicia
40 logo

DETAILED DESCRIPTION OF THE PREFERRED EMBODIMENTS

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

Turning now descriptively to the drawings, in which similar reference characters denote similar elements throughout the several views, FIGS. 1 through 9 illustrate a rafter square of the present invention which is indicated generally by the reference numeral 10.

FIG. 1 is an illustrative view of the rafter square of the present invention in use. The present invention, a rafter square 10, is used for facilitating the laying out of angle cuts in rafters 18. The main portion of the square includes a right-angle square 16 which is similar to a conventional square. The right-angle square 16 includes of a first member and a second member connected at a distal end of each member to form a right angle therebetween. At the inside corner of the right-angle square is a protractor-like curved edge 17. The protractor-like curved edge 17 is a curvilinear body extending from a predetermined point on the first member to a predetermined point on the second member. A plurality of indicia are positioned along the curvilinear body 17 and are used to measure angles. The right-angle square 16 has a detachable guide. The guide includes a pivotal indicator guide 12 and a pivotal indicator arm 14 attached to the heel portion of the right-angle square 16. The pivotal indicator guide 12 is attached to the pivotal indicator arm 14 at a right-angle. The pivotal indicator guide 12 and the pivotal indicator arm 14 pivot about a pivot point 24 and can be secured by tightening the pin slide knob 20 and the pivot point knob 22 at a specified angle as marked on the protractor-like curved edge 17 for common rafters, hip rafters and degrees. Angles of the rafters 18 can be measured by framing up the pivotal indicator arm 14 against a flat surface and adjusting the pivotal indicator guide 12 to the desired angle as denoted by the indicia on the protractor-like curved edge 17.

The pivotal indicator arm 14 provides a surface for the user to lay against a straight edge in order to produce a reference angle to measure from. Provided on the right-angle square is a conversion table 30 providing information for irregular hips and valleys, as will be discussed in FIG. 9. As shown in FIG. 1, the rafter square is repeatedly used throughout the process of constructing rafters. By clamping the guide to the desired setting saves time for aligning increments on two separate sides of the square, several times on one work piece for plumb cuts, seat cuts and over hangs. Speed and accuracy is achieved by having the guide press to the work piece and not having to align over material with rounded edges, missing pieces and knots.

Figure 2:
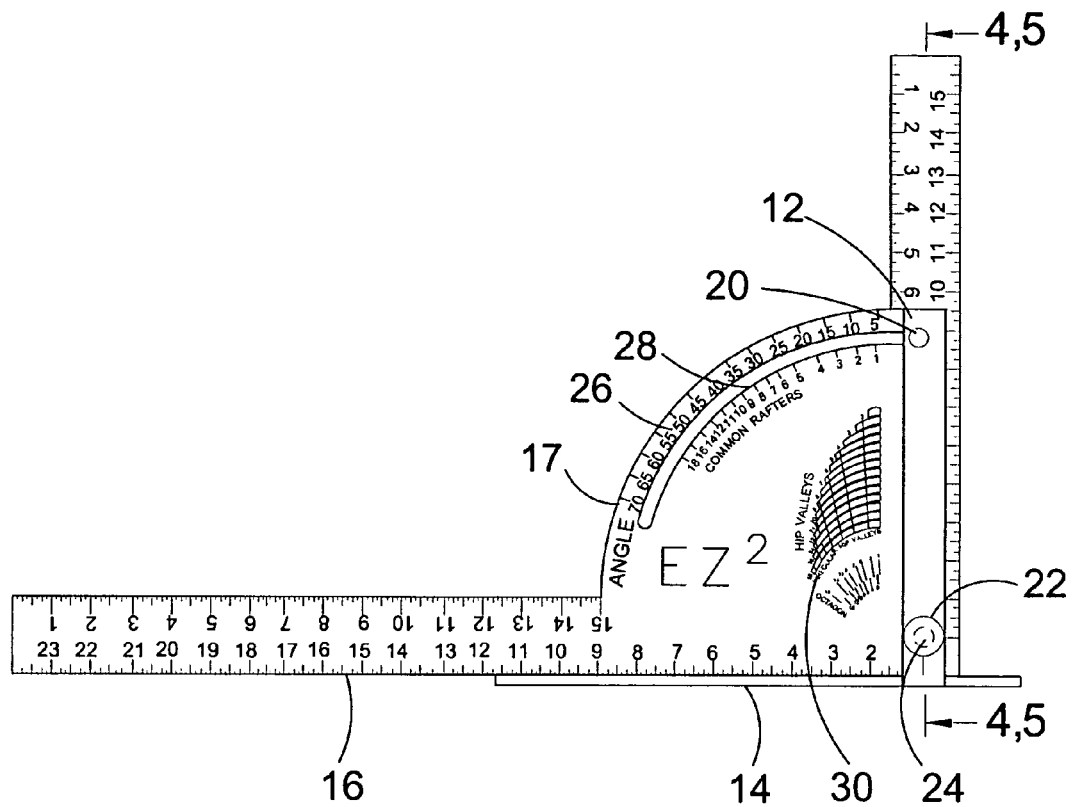
FIG. 2 is a top view of the rafter square of the present invention and its components.

FIG. 2 is a top view of the rafter square of the present invention and its components. Shown is a top view of the rafter square 10 of the present invention. The main portion of the square includes a right-angle square 16 which is similar to a conventional square. The right-angle square 16 includes a first member and a second member connected at the end of each member to form a right angle therebetween. At the inside corner of the right-angle square is a protractor-like curved edge 17 that can be used to measure angles. Angles can be measured by framing up the pivotal indicator arm 14 against a flat surface and adjusting the pivotal indicator guide 12 to the desired angle as denoted by the indicia on the protractor-like curved edge. The right-angle square 16 has a detachable guide including a pivotal indicator guide 12 and a pivotal indicator arm 14 attached to the heel portion of the right-angle square 16. The pivotal indicator guide 12 is attached to the pivotal indicator arm 14 at a right-angle. The pivotal indicator guide 12 and the pivotal indicator arm 14 pivot about a pivot point 24 and can be secured by tightening the slide pin knob 20 and the pivot point knob 22 at a specified angle as marked on the protractor-like curved edge 17 for common rafters, hip rafters and degrees.

The pivotal indicator arm 14 provides a surface for the user to lay against a straight edge in order to produce a reference angle to measure from. The pivotal indicator arm 14 and the pivotal indicator guide 12 are detachable from the square portion by unscrewing the slide pin knob 20 and the pivot point knob 22 that secures the device to the slide pin track 28 and pivot point 24 located on the heel portion of the right-angle square 16. The slide pin track 28 runs curvilinearly inside the protractor-like curved edge 17. A slide pin knob 20 is provided to allow the pivotal indicator guide 12 to slide along the slide pin track 28 to point to a specific one of the angle indicia 26 along the slide pin track 28. By tightening the slide pin knob 20 and pivot point knob 22, the pivotal indicator guide 12 is secured at a specific angle in relation to the right-angel square 16, thus providing an exact and constant angle for the user to work with when constructing rafters. By clamping the guide to the desired setting saves time for aligning increments on two separate sides of the square, several times on one work piece for plumb cuts, seat cuts and over hangs. Speed and accuracy is achieved by having the guide press to the work piece and not having to align over material with rounded edges, missing pieces and knots. Provided on the right-angle square is a conversion table 30 providing information for irregular hips and valleys, as will be discussed in FIG. 9.

Figure 3:
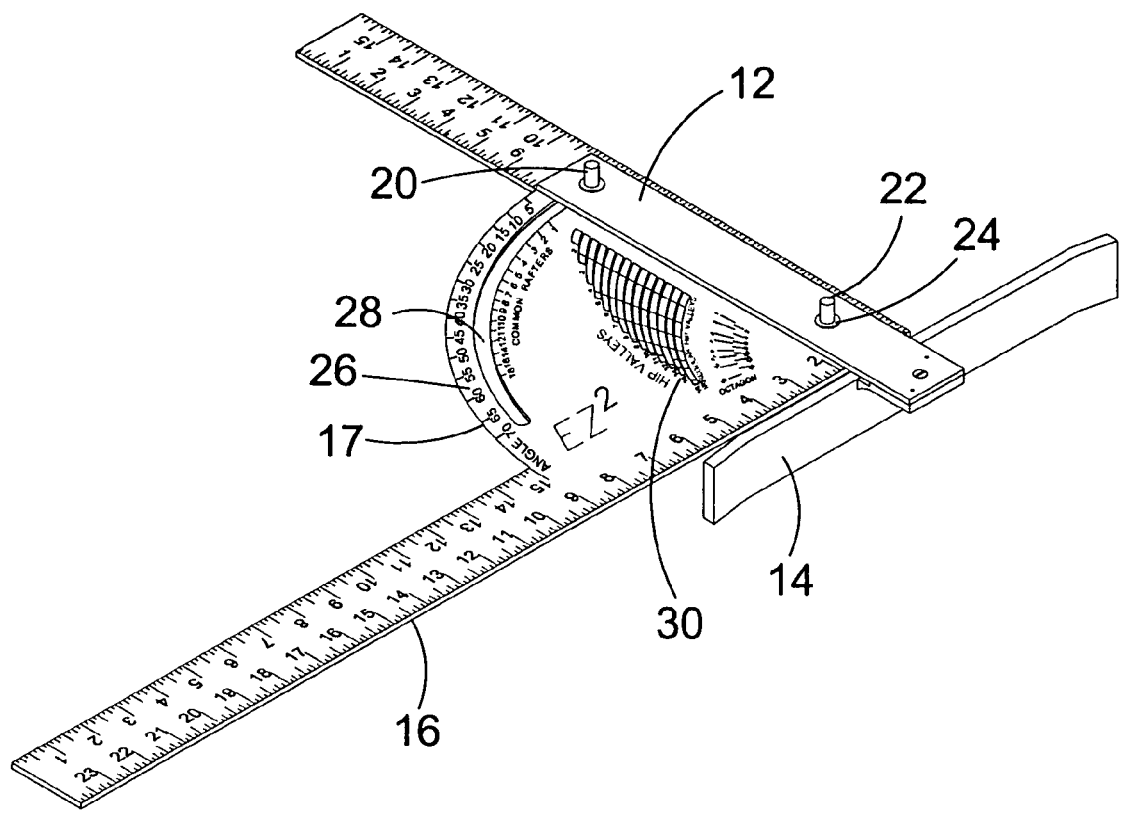
FIG. 3 is a perspective view of the rafter square of the present invention and its components.

FIG. 3 is a perspective view of the rafter square of the present invention and its components. Shown is a perspective view of the rafter square 10 of the present invention. The main portion of the square includes a right-angle square 16 which is similar to a conventional square. The right-angle square 16 includes of a first member and a second member connected at the end of each member to form a right angle therebetween. At the inside corner of the right-angle square is a protractor-like curved edge 17. The protractor-like curved edge 17 is a curvilinear body extending from a predetermined point on the first member of the right-angle square 16 to a predetermined point on the second member. Along the curvilinear body are indicia used to measure angles. Angles can be measured by framing up the pivotal indicator arm 14 against a flat surface and adjusting the pivotal indicator guide 12 to the desired angle as denoted by the indicia on the protractor-like curved edge.

The right-angle square 16 has a detachable guide including of a pivotal indicator guide 12 and a pivotal indicator arm 14 attached to the heel portion of the right-angle square 16. The pivotal indicator guide 12 is attached to the pivotal indicator arm 14 at a right-angle. The pivotal indicator guide 12 and the pivotal indicator arm 14 pivot about a pivot point 24 and can be secured by tightening the pin slide knob 20 and the pivot point knob 22 at a specified angle as marked on the protractor-like curved edge 17 for common rafters, hip rafters and degrees. The pivotal indicator arm 14 provides a surface for the user to lay against a straight edge in order to produce a reference angle to measure from. The pivotal indicator arm 14 and the pivotal indicator guide 12 are detachable from the square portion by unscrewing the slide pin knob 20 and the pivot point knob 22 that secures the device to the slide pin track 28 and pivotal point 24 located on the heel portion of the right-angle square 16. The slide pin track 28 runs curvilinearly inside the protractor-like curved edge 17. A slide pin knob 20 is provided to allow the pivotal indicator guide 12 to slide along the slide pin track 28 to point to a specific one of the angle indicia 26 along the slide pin track 28. By tightening the slide pin knob 20 and pivot point knob 22, the pivotal indicator guide 12 is secured at a specific angle in relation to the right-angel square 16, thus providing an exact and constant angle for the user to work with when constructing rafters. By clamping the guide to the desired setting saves time for aligning increments on two separate sides of the square, several times on one work piece for plumb cuts, seat cuts and over hangs. Speed and accuracy is achieved by having the guide press to the work piece and not having to align over material with rounded edges, missing pieces and knots. Provided on the right-angle square is a conversion table 30 providing information for irregular hips and valleys, as will be discussed in FIG. 9.

Figure 4:
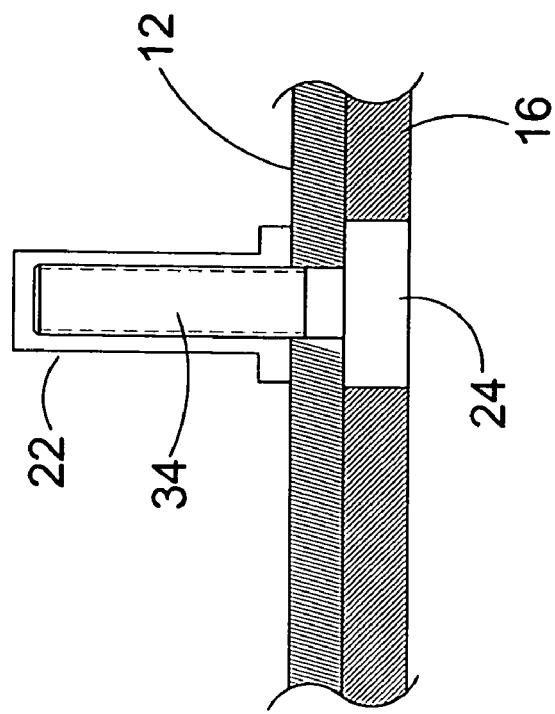
FIG. 4 is a cross-sectional view of the slide pin and pivot point pin of the rafter square of the present invention.
Figure 4:
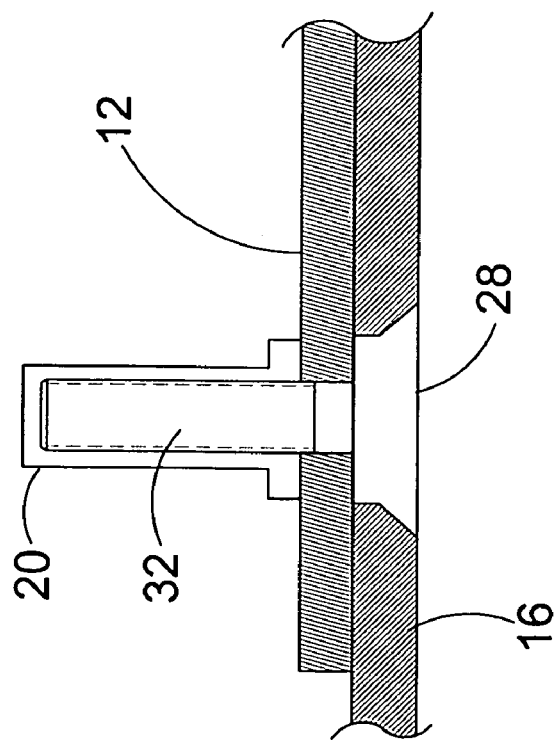

FIG. 4 is a cross-sectional view of the slide pin and pivot point pin of the rafter square of the present invention. Shown are cross-sectional views of the slide pin 32 and the pivot point 34 of the device taken along line 4—4 in FIG. 2. The slide pin 32 adjusts by tightening and loosening the slide pin knob 20 to allow the pivotal indicator guide 12 to slide along the slide pin track 28 and point to the angle indicia 26 inscribed on the surface portion of protractor-like curved edge 17. The pivot pin 34 can also be adjusted by the pivot pin knob 22 to secure the pivotal indicator guide 12 on the right-angle square 16 at the pivot point 24. As the pivotal indicator guide 12 is positioned, the pivotal indicator arm 14 follows suite. By tightening the slide pin knob 20 and pivot point knob 22, the pivotal indicator guide 12 is secured at a specific angle in relation to the right-angel square 16, thus providing an exact and constant angle for the user to work with when constructing rafters. By clamping the guide to the desired setting saves time for aligning increments on two separate sides of the square, several times on one work piece for plumb cuts, seat cuts and over hangs. Speed and accuracy is achieved by having the guide press to the work piece and not having to align over material with rounded edges, missing pieces and knots.

Figure 5:
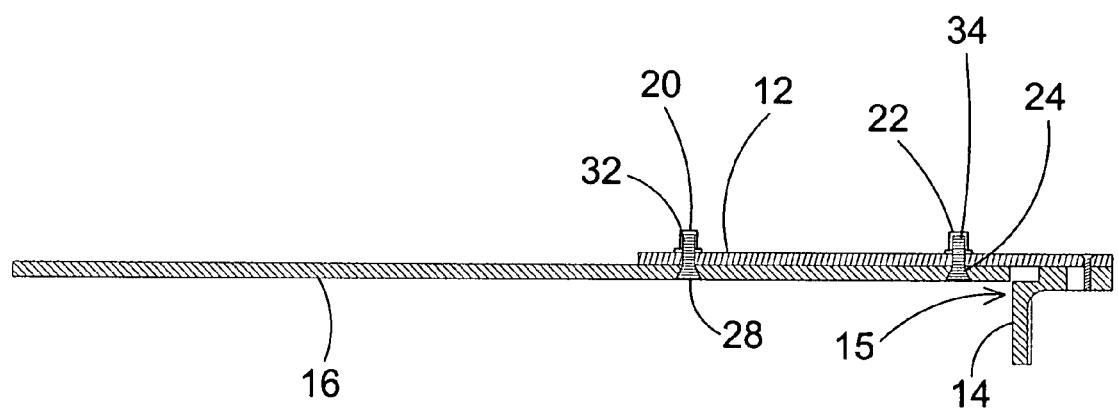
FIG. 5 is a cross-sectional view of the rafter square of the present invention.

FIG. 5 is a cross-sectional view of the rafter square of the present invention. Shown is another cross-sectional view of the slide pin 32 and pivot point 34 portion of the device taken along line 4—4 in FIG. 2. The slide pin 32 adjusts by tightening and loosening the slide pin knob 20 to allow the pivotal indicator guide 12 to slide along the slide pin track 28 and point to the angle indicia 26 inscribed on the surface portion of protractor-like curved edge 17, as described in FIG. 2. The pivot pin 34 can also be adjusted by the pivot pin knob 22 to secure the pivotal indicator guide 12 on the right-angle square 16 at the pivot point 24. As the pivotal indicator guide 12 is positioned, the pivotal indicator arm 14 follows suite. The pivotal indicator arm 14 provides a pivotal indicator arm surface 15 for the user to lay against a straight edge in order to produce a reference angle to measure from. By tightening the slide pin knob 20 and pivot point knob 22, the pivotal indicator guide 12 is secured at a specific angle in relation to the right-angel square 16, thus providing an exact and constant angle for the user to work with when constructing rafters. By clamping the guide to the desired setting saves time for aligning increments on two separate sides of the square, several times on one work piece for plumb cuts, seat cuts and over hangs. Speed and accuracy is achieved by having the guide press to the work piece and not having to align over material with rounded edges, missing pieces and knots.

Figure 6:
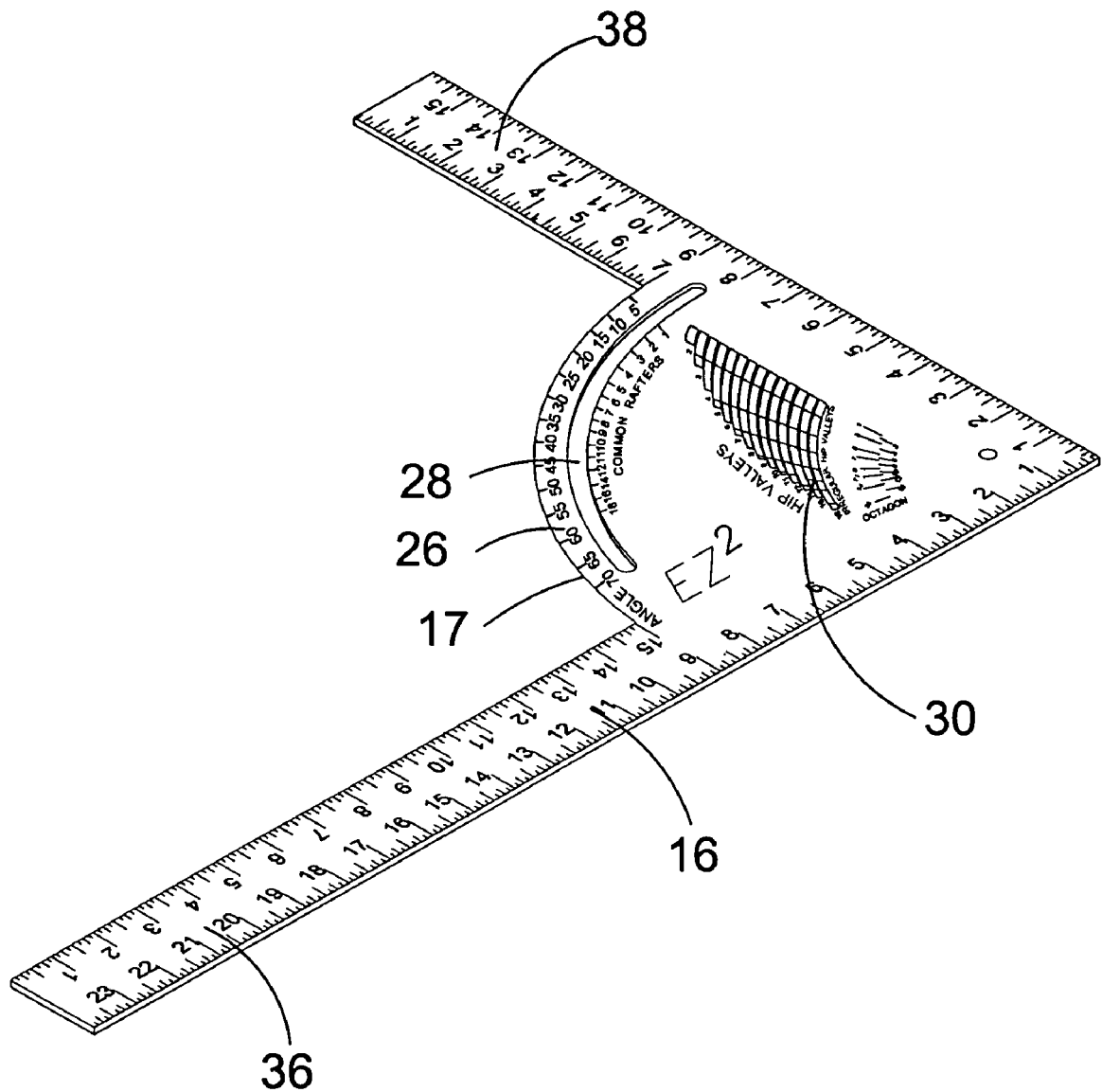
FIG. 6 is a perspective view of the rafter square of the present invention with the detachable guide removed.

FIG. 6 is a perspective view of the rafter square of the present invention with the detachable guide. Shown is a perspective view of the right-angle square 16 without the pivotal indicator guide 12 and the pivotal indicator arm 14 attached. The pivotal indicator guide 12 and the pivotal indicator guide 14 can be detached from the square portion by unscrewing the slide pin knob 20 and pivot pin knob 22 from the slide pin 32 and the pivot pin 34, respectively, as shown and discussed in FIG. 2. Holding the right-angle square such that it represents an "L" shape, the seat cut indicia 36 is inscribed on the vertical edge and the plumb cut indicia 38 inscribed on the horizontal edge. The seat cut indicia 36 and the plumb cut indicia 38 are utilized by the user to make length measurements. Also inscribed on the right-angle square 16 is a conversion chart 30. The conversion chart 30 is used to facilitate calculating the proper length and angles for specific rafter purposes. By clamping the guide to the desired setting saves time for aligning increments on two separate sides of the square, several times on one work piece for plumb cuts, seat cuts and over hangs. Speed and accuracy is achieved by having the guide press to the work piece and not having to align over material with rounded edges, missing pieces and knots.

Figure 7:
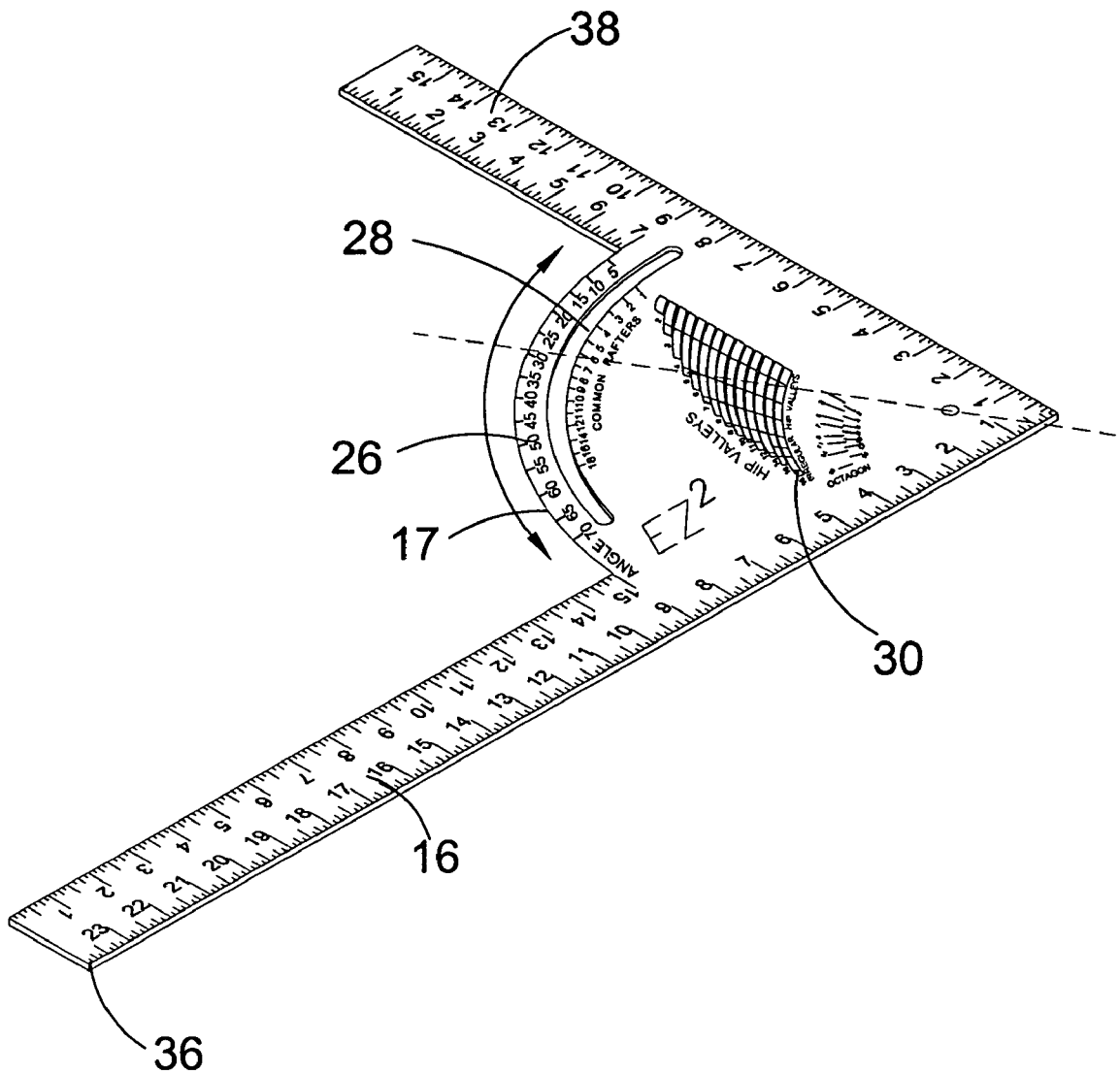
FIG. 7 is a perspective view of the rafter square of the present invention.

FIG. 7 is a perspective view of the rafter square of the present invention. Shown is a perspective view of the right-angle square 16 measuring an angle using the protractor-like curved edge 17. The right-angle square 16 is show without the pivotal indicator guide 12 and the pivotal indicator arm 14 attached. The pivotal indicator guide 12 and the pivotal indicator guide 14 can be detached from the square portion by unscrewing the slide pin knob 20 and pivot pin knob 22 from the slide pin 32 and the pivot pin 34, respectively, as shown in FIG. 2. Holding the right-angle square such that it represents an "L" shape, the seat cut indicia 36 is inscribed on the vertical edge and the plumb cut indicia 38 inscribed on the horizontal edge. The seat cut indicia 36 and the plumb cut indicia 38 are utilized by the user to make length measurements. Also inscribed on the right-angle square 16 is a conversion chart 30. The conversion chart 30 is used to facilitate calculating the proper length and angles for specific rafter purposes. By clamping the guide to the desired setting saves time for aligning increments on two separate sides of the square, several times on one work piece for plumb cuts, seat cuts and over hangs. Speed and accuracy is achieved by having the guide press to the work piece and not having to align over material with rounded edges, missing pieces and knots. The dotted line represents and angle of measurement. The angle measurement is indicated by where the line crosses the angle indicia 26 located on the protractor-like curved edge 17.

Figure 8:
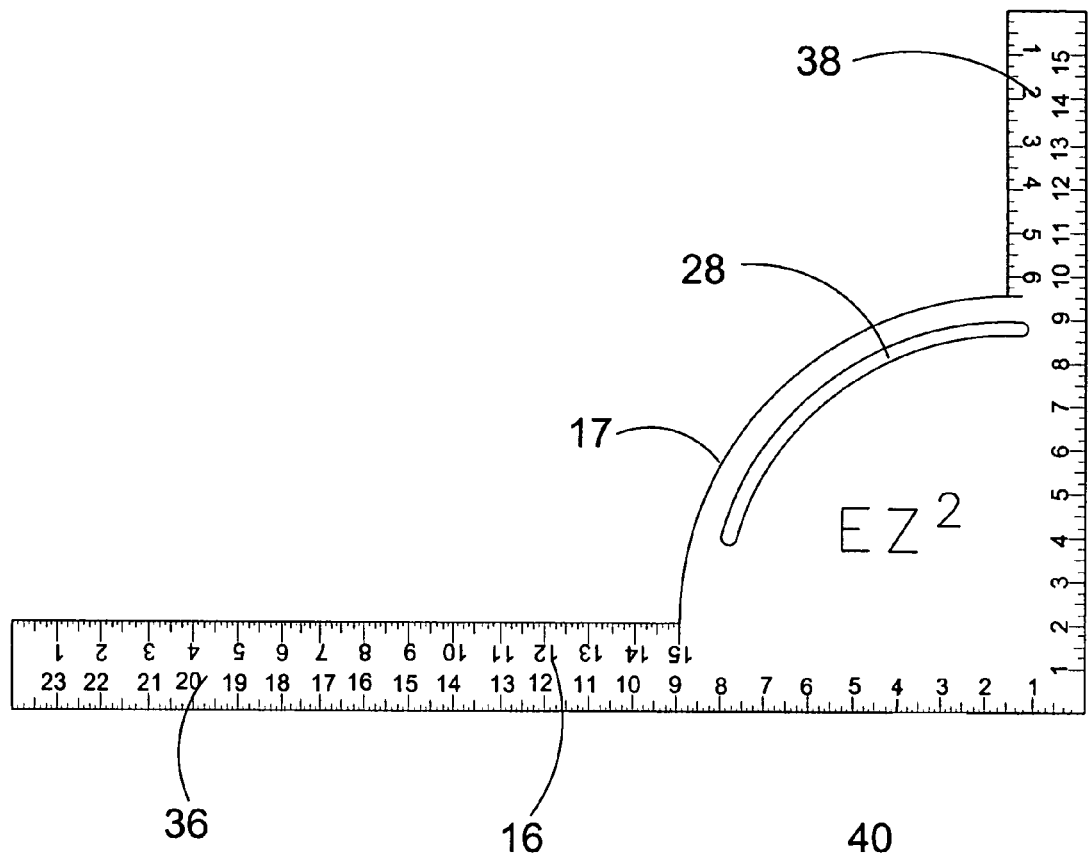
FIG. 8 is a top view of the rear side of the rafter square of the present invention.

FIG. 8 is a top view of the underside of the rafter square of the present invention. Shown is the underside of the rafter square 10 of the present invention. Holding the right-angle square such that it represents an "L" shape, the seat cut indicia 36 is inscribed on the vertical edge and the plumb cut indicia 38 inscribed on the horizontal edge. The seat cut indicia 36 and the plumb cut indicia 38 are utilized by the user to make length measurements. Also shown in the figure is the pin slide track 28 on which the pivotal indicator guide 12 slides, as shown in FIG. 3. The pivotal indicator guide 12 and the pivotal indicator arm 14 pivot about a pivot point 24 and can be secured onto the right-angle square 16 by tightening the pin slide knob 20 and the pivot point knob 22 at a specified angle as marked on the protractor-like curved edge 17 for common rafters, hip rafters and degrees, as shown in FIG. 4. Additionally, a logo 40 can be inscribed on the underside of the right-angle square 10.

Figure 9:
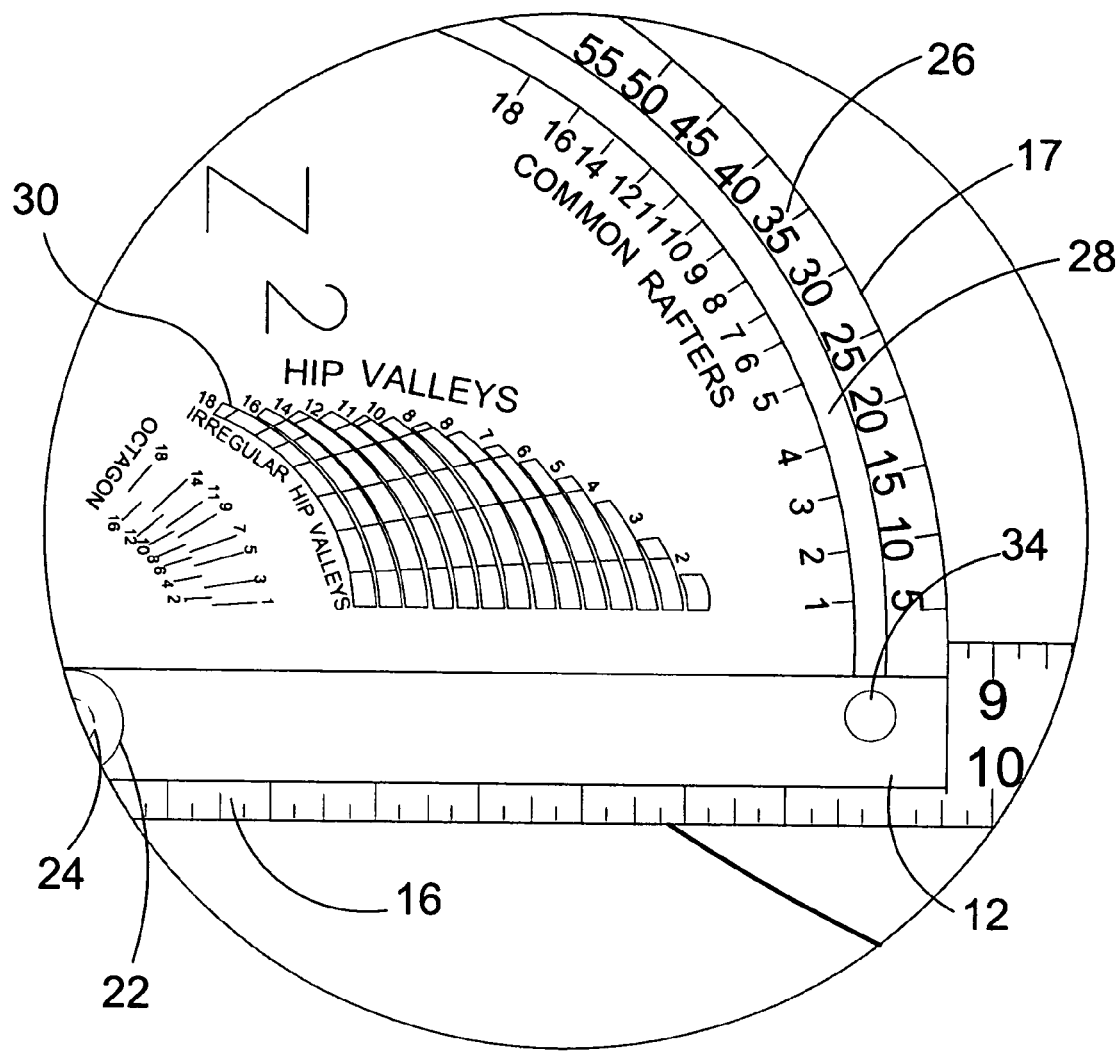
FIG. 9 is an illustrative view of the indicia inscribed on the present invention.

FIG. 9 is an illustrative view of the indicia inscribed on the present invention. Shown is a detailed view of the present invention having a conversion chart 30 of points inscribed on the protractor-like curved edge 17 of the right-angle square 16 whereby the user selectively secures the pivotal arm guide 12 by tightening the slide pin knob 20 on the slide pin 34 at the appropriate angle required for the cut of roofing styles, such as; gable, cross gabled, simple hip, pyramid hip, cross hipped, mansard, saltbox, gambrel and simple flat roof, as shown in FIG. 2. The protractor-like curved edge 17 of the right-angle rule is inscribed with angle indicia 26 as well as other indicia. The conversion chart 30 of points is comprised of arithmetical guide markings for said various style roofing including general angles, common rafters slope, as well as hip valley rafters and octagonal construction. By clamping the guide to the desired setting saves time for aligning increments on two separate sides of the square, several times on one work piece for plumb cuts, seat cuts and over hangs.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A framing square comprising:
   a) a right-angle square formed from a first leg and a second leg at right angles to each other, said legs being joined at a right-angle connection;
   b) said right-angle square having a protractor shaped portion between said first and second legs extending from a midsection of said first leg to a midsection of said second leg and to said right-angle connection, said protractor shaped portion having a circular slot with angular indicia along edges of said slot;
   c) an indicator guide positioned on a first side of said right-angle square and having a proximate end pivotally connected at a pivot point positioned at said right angle connection and moveable about said pivot point;
   d) an indicator arm having a proximate end connected to the proximate end of said indicator guide, said indicator arm and said indicator guide being at a right angle to each other and rotatable together about said pivot point;
   e) said indicator guide having a member sliding in said circular slot of said proctor shaped portion and means for locking said indicator guide in a position along said slot so that a user is able to consistently measure a same angle; and
   g) said protractor shaped portion having a conversion table etched on a surface traversed by said indicator guide, said conversion guide being comprised of arithmetical guide markings for various style roofing including general angles, common rafters slope, hip valley rafters and octagonal construction whereby a user can selectively position said indicator arm to selectively choose an appropriate angle for one of a plurality of roofing styles, obtain a direct conversion parameter correspondent to said various style roofing, and at the same time use said conversion guide to calculate proper length and angles for specific rafter purposes without repositioning said indicator arm.

2. The framing square as recited in claim 1, wherein when said framing square is held with said first leg in a vertical position indicia inscribed on said first leg are seat cut indicia and indicia inscribed on said second leg are plumb cut indicia.

3. The framing square as recited in claim 2, wherein said plurality of roofing styles include gable, cross gabled, simple hip, pyramid hip, cross hipped, mansard, saltbox, gambrel and simple flat roof.

4. The framing square as recited in claim 3, wherein said indicator arm provides a surface for the user to rest said right angle square there against thereby allowing rapid determination of said predetermined angle.

* * * * *